E. A. HAWTHORNE.
ELECTRIC LAMP.
APPLICATION FILED JUNE 25, 1913.
1,090,983.
Patented Mar. 24, 1914.
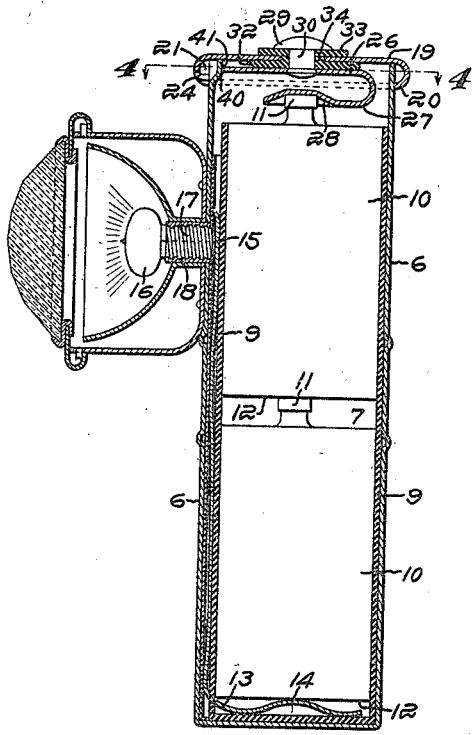
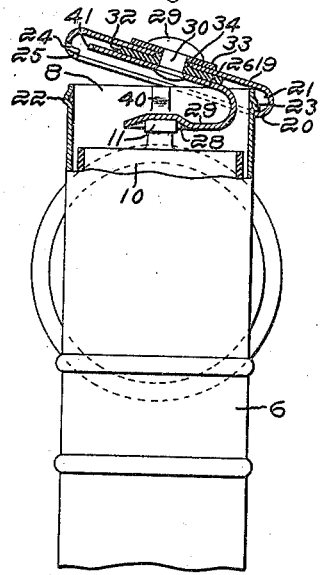
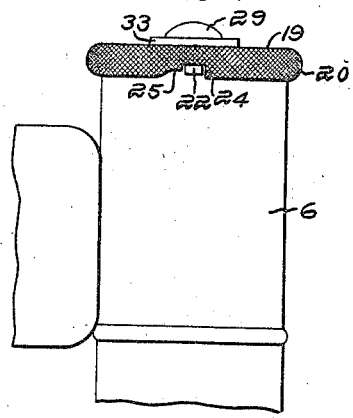
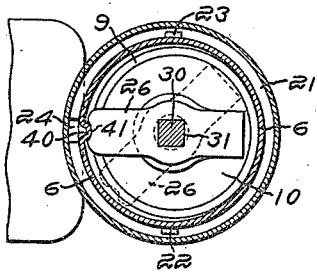
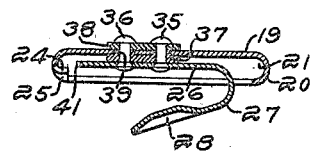
Witnesses
Carl L. Choate.
Horace A. Croseman.
Inventor:
Ellsworth A. Hawthorne,
by Emery, Booth, Janney & Varney.
Attys.

UNITED STATES PATENT OFFICE.

ELLSWORTH A. HAWTHORNE, OF BRIDGEPORT, CONNECTICUT.

ELECTRIC LAMP.

1,090,983.  Specification of Letters Patent.  Patented Mar. 24, 1914.

Application filed June 25, 1913. Serial No. 775,636.

*To all whom it may concern:*

Be it known that I, ELLSWORTH A. HAWTHORNE, a citizen of the United States, residing at No. 35 Spruce street, Bridgeport, county of Fairfield, and State of Connecticut, have invented an Improvement in Electric Lamps, of which the following description, in connection with the accompanying drawings, is a specification, like characters on the drawings representing like parts.

This invention relates to electric lamps, whose source of supply is a battery contained within the lamp casing, and more especially to the switch by means of which the battery circuit is completed.

My invention will be best understood by reference to the following specification, when taken in connection with the accompanying drawings of one specific embodiment thereof, while its scope will be more particularly pointed out in the appended claims.

In the drawings: Figure 1 is a central, vertical sectional view of an electric lamp embodying my invention; Fig. 2 is a rear elevation, partly in vertical section, illustrating the manner in which the cap of the casing is attached and detached; Fig. 3 is a side elevation of a portion of the lamp illustrating a part of the cap-retaining devices; Fig. 4 is a plan section on line 4—4 of Fig. 1; and Fig. 5 is a central vertical section illustrating a modification of the switch.

Referring to the drawings, and to the embodiment of my invention which I have selected for illustrative purposes, I have there shown an electric lamp having a metallic casing 6, constituting a housing for one or more batteries 7. In the present instance, the casing is closed at the bottom and is provided at the top with an orifice 8 for the introduction of the battery. While I may employ any suitable type of battery, I have selected for illustration a battery comprising an insulated jacket 9, inclosing two dry cells 10—10, each having a terminal 11 located centrally at one end thereof, and a metallic casing 12, constituting the other terminal of the cell. These two cells are placed end to end, so that the terminal 11 of one abuts against the bottom of the metallic casing 12 of the other. It will be understood, however, that the described battery is merely typical, and any appropriate battery may be employed. Herein the lower cell 10 rests upon a conductor 13, comprising a strip of metal bent to form a spring 14 beneath the cell, for a purpose which will presently appear, said conductor extending thence between inner and outer layers of the insulating jacket to a point at one side of the lamp casing adjacent the top, where the conductor contacts with one terminal 15 of an incandescent lamp 16, while the other terminal 17 is screwed into a socket 18 appropriately mounted in and having electrical connection with the casing 6. The orifice of the casing is herein provided with a cap 19, having an inwardly turned depending flange 20 provided with an internal annular groove 21 to receive a pair of external lugs 22 and 23, appropriately formed on the casing 6. The flange 20 is herein provided with a notch or cut-away portion 24, to admit either the lug 22 or the lug 23. Adjacent this notch, the flange is bent upward to form a stock 25, which serves to engage one side of the lug 22, and prevent the cap from being rotated in one direction. In applying the cap to the casing, the flange 20 is first hooked onto the under side of one of the lugs, herein the lug 23, as shown in Fig. 2, after which the opposite side of the cap is pressed down into place, so that the lug 22 enters the notch 24, whereupon the cap may be rotated until the latter lug is out of register with the notch. The cap is now locked in the case in such a manner as to be incapable of being withdrawn axially, without first rotating the same in the proper direction to bring the notch 24 into register with the lug 22. The described cap may serve as a switch carrying element, as well as a closure for the orifice of the casing, and to that end, carries a contact member 26, secured to, but insulated from, the cap. This contact member is herein provided with a yielding arm 27, constituting a spring contact having a depression 28 resting upon and making electrical contact with the terminal 11 of the upper cell of the battery. This spring arm serves several useful purposes. In the first place, it serves to insure a good electric connection between the contact member and the terminal of the upper cell. In the second place, it insures a good contact between the bottom of the metallic casing of the upper cell and the terminal 11 of the lower cell. In the third place, it insures a good electric contact between the bottom of the lower cell and the spring portion 14 of the conductor 13. Lastly, it holds the flange 20 with a firm spring pressure against the under side of the lugs 22 and 23, and thereby tends to hold the cap against accidental rotation.

The contact member 26 may be secured to and insulated from the cap in any appropriate manner, but in the form shown in Figs. 1 to 4, inclusive, is attached to the cap by means of a rivet 29, having a square shank 30 extending through a correspondingly shaped perforation 31 in the contact member. The rivet and contact member are insulated from the cap by inner and outer washers 32 and 33, and a bushing 34, all formed of suitable insulating material, such as fiber. In the modification shown in Fig. 5, I have simply substituted for the described square shank rivet a pair of rivets 35 and 36 extending through the contact member and insulated from the cap and contact member by insulating washers 37 and 38, and insulating bushings 39. The contact member 26 may serve to complete the battery circuit through the metallic casing 6 in any other appropriate manner, but herein the casing is provided with an internal lug 40, and the horizontally extending terminal portion of the contact member is provided with a notch 41 adapted to receive said lug, thereby to lock the contact member and cap against accidental rotation when the circuit is complete. The circumferential wall of the casing, being somewhat resilient, is capable of yielding to allow the lug 40 to snap into and out of the notch 41. Herein the lug 40 is rounded, and the adjacent end of the contact member is rounded or beveled at its corners,—that is to say, has a cam-like formation, by reason of which it is adapted to engage the rounded lug 40 and force the latter outwardly, until the notch 41 registers with the lug, whereupon the latter will enter the notch and firmly press inwardly against the contact member. This will insure a firm engagement between their abutting surfaces, and moreover, since one part rubs upon the other as they are moved into or out of engagement, these surfaces are kept dry and clean, so as to make a good electrical connection. It will be observed that the arm 28, where it bears upon the terminal 11, turns to and fro as the cap is rotated, and this also tends to prevent corrosion and to keep the abutting surfaces in good electrical contact.

Referring to Fig. 4, I have there illustrated the manner in which the switch is operated by rotating the cap, thus moving the contact member from the position shown in full lines to the position shown in dotted lines and vice versa, whereby the circuit is completed or broken at will. When the switch is in either position, it is held against accidental rotation, and is therefore unaffected by the vibration to which a lamp of this character when used for vehicles is subjected.

While I have herein shown and described two specific forms of embodiments of my invention for illustrative purposes, and have disclosed and discussed in detail the construction and arrangement incidental to two specific applications thereof, it is to be understood that the invention is limited neither to the mere details or relative arrangement of parts nor to its specific embodiments herein shown, but that extensive deviations from the illustrated forms or embodiments of the invention may be made without departing from the principles thereof.

Having thus described my invention, what I claim and desire by Letters Patent to procure is:—

1. The combination with a battery, of a battery casing, and means to complete the battery circuit including a member rotatably mounted on said casing, and means carried by said member to close the battery circuit and hold said member against rotation.

2. The combination with a battery, of a battery casing, and means to complete the battery circuit including a member rotatably mounted on said casing, and means carried by said member adapted to interengage with said casing to close the battery circuit and hold said member against rotation.

3. The combination with a battery, of a battery casing having a rotatable cap, and means carried by said cap for closing the battery circuit and holding the cap against accidental rotation.

4. The combination with a battery, of a battery casing having a rotatable cap, and means carried by said cap for closing the battery circuit and holding the cap by spring pressure against accidental rotation.

5. The combination with a battery, of a metallic battery casing constituting a part of the battery circuit, a movable metallic cap for said casing, and means carried by movement of said cap for completing the battery circuit through said casing.

6. The combination with a battery, of a metallic battery casing constituting a part of the battery circuit, a movable metallic cap for said casing, and means carried by movement of said cap for completing the battery circuit through said casing and holding said cap against accidental movement with relation to said casing.

7. The combination with a battery of a battery casing having a rotatable cap, and a switch for opening and closing the battery circuit including a contact member carried by said cap and engaging one of the battery terminals at all times during the opening and closing of the battery circuit by said switch.

8. The combination with a battery of a battery casing having a rotatable cap, and a switch for opening and closing the battery circuit including a contact member carried by said cap and engaging one of the battery terminals with spring pressure at all times during the opening and closing of the battery circuit by said switch.

9. The combination with a battery of a battery casing having a rotatable cap, and a switch for opening and closing the battery circuit including a contact member carried by but insulated from said cap and engaging one of the battery terminals at all times during the opening and closing of the battery circuit by said switch.

10. The combination with a battery of a battery casing having a rotatable cap, and a switch for the battery circuit comprising a contact member secured to but insulated from said cap and constantly engaging one of the battery terminals with spring pressure, said contact member being rotatable with said cap into and out of position to close the battery circuit while still engaging said battery terminal.

11. The combination with a battery of a battery casing, a cap rotatably mounted on said casing, the latter having means interengaging with said cap normally to hold said cap against axial movement, and means carried by said cap to complete the battery circuit and hold the cap against rotation.

12. The combination with a battery, of a battery casing provided with an inwardly projecting lug, a cap swiveled on said casing, and means for completing the battery circuit comprising a contact member carried by said cap and adapted to be carried thereby into engagement with said lug.

13. The combination with a battery, of a metallic battery casing in electrical connection with one of the terminals of said battery, said casing being provided with a plurality of external lugs and an internal lug, a cap rotatably mounted on said casing and having an inwardly turned flanged engaging the under side of said external lugs, said flange having a notch to admit one of said external lugs, and a contact member secured to and insulated from said cap and adapted to be carried by the rotation of said cap into and out of engagement with said internal lug, said member being provided with a notch to receive said internal lug thereby to hold said cap against accidental rotation, and said member having a portion engaging the remaining terminal of the battery with spring pressure.

In testimony whereof, I have signed my name to this specification, in the presence of two subscribing witnesses.

ELLSWORTH A. HAWTHORNE.

Witnesses:
E. HORACE HAWTHORNE,
VERONICA L. KELLEY.